United States Patent
Fan et al.

(10) Patent No.: US 7,535,670 B2
(45) Date of Patent: May 19, 2009

(54) FLOW OR WINDAGE CONTROL FOR A CANTILEVERED HEAD ASSEMBLY

(75) Inventors: Yaling D. Fan, Shakopee, MN (US); Mark A. Toffle, St. Louis Park, MN (US); Xu Zuo, Prior Lake, MN (US); Srinivas Tadepalli, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 584 days.

(21) Appl. No.: 10/768,595

(22) Filed: Jan. 30, 2004

(65) Prior Publication Data

US 2004/0257691 A1    Dec. 23, 2004

Related U.S. Application Data

(60) Provisional application No. 60/449,566, filed on Feb. 21, 2003.

(51) Int. Cl.
    *G11B 33/14* (2006.01)
(52) U.S. Cl. .................. 360/97.02; 360/75; 360/244.2; 360/230
(58) Field of Classification Search ... 360/97.01–97.02, 360/244.2–245.7, 137, 75
    See application file for complete search history.

(56) References Cited

U.S. PATENT DOCUMENTS

| | | | |
|---|---|---|---|
| 3,148,248 A * | 9/1964 | Johnson | 360/230 |
| 4,285,018 A | 8/1981 | Mulvany et al. | |
| 4,583,213 A | 4/1986 | Bracken et al. | |
| 4,636,891 A | 1/1987 | Barski | |
| 5,636,082 A * | 6/1997 | Shibuya et al. | 360/97.02 |
| 5,696,649 A | 12/1997 | Boutaghou | |
| 5,818,658 A * | 10/1998 | Balster et al. | 360/75 |
| 5,898,545 A * | 4/1999 | Schirle | 360/254.7 |
| 5,907,453 A * | 5/1999 | Wood et al. | 360/97.02 |
| 5,956,203 A * | 9/1999 | Schirle et al. | 360/97.03 |
| 6,091,570 A | 7/2000 | Hendriks | |
| 6,147,834 A * | 11/2000 | Srikrishna et al. | 360/97.02 |
| 6,259,576 B1 * | 7/2001 | Ahn | 360/75 |
| 6,369,978 B1 * | 4/2002 | Shimizu et al. | 360/97.03 |
| 6,392,832 B1 | 5/2002 | Oshiki et al. | |
| 6,445,540 B1 * | 9/2002 | Toffle et al. | 360/137 |
| 6,449,119 B1 | 9/2002 | Hashizume et al. | |
| 6,710,977 B2 * | 3/2004 | Tadepalli et al. | 360/244.2 |
| 6,728,062 B1 * | 4/2004 | Ou-Yang et al. | 360/97.02 |
| 6,900,968 B2 * | 5/2005 | Buske et al. | 360/265.2 |
| 6,917,858 B2 * | 7/2005 | Boger | 700/282 |
| 6,937,433 B2 * | 8/2005 | Dahlenburg et al. | 360/97.03 |
| 6,985,333 B1 * | 1/2006 | Hiller et al. | 360/235.5 |
| 6,987,640 B2 * | 1/2006 | Tsang et al. | 360/97.02 |
| 2002/0015255 A1 * | 2/2002 | Tadepalli et al. | 360/97.02 |
| 2002/0030924 A1 * | 3/2002 | Shimizu et al. | 360/97.03 |
| 2002/0039253 A1 * | 4/2002 | Imai et al. | 360/97.02 |
| 2002/0075591 A1 * | 6/2002 | Chang et al. | 360/97.02 |
| 2002/0181138 A1 | 12/2002 | Toffle et al. | |
| 2002/0181148 A1 * | 12/2002 | Dahlenburg et al. | 360/97.02 |
| 2004/0184180 A1 * | 9/2004 | Tadepalli et al. | 360/75 |

* cited by examiner

*Primary Examiner*—Hoa T Nguyen
*Assistant Examiner*—Dismery E Mercedes
(74) *Attorney, Agent, or Firm*—Fellers, Snider, et al.

(57) ABSTRACT

An apparatus including a cantilevered head assembly is disclosed. The apparatus includes a flow control device to control flow proximate to the cantilevered head assembly. In one embodiment, the flow control device includes a blower assembly coupleable to a pressure source and/or vacuum assembly to limit flow disturbances proximate to the cantilevered head assembly.

22 Claims, 13 Drawing Sheets

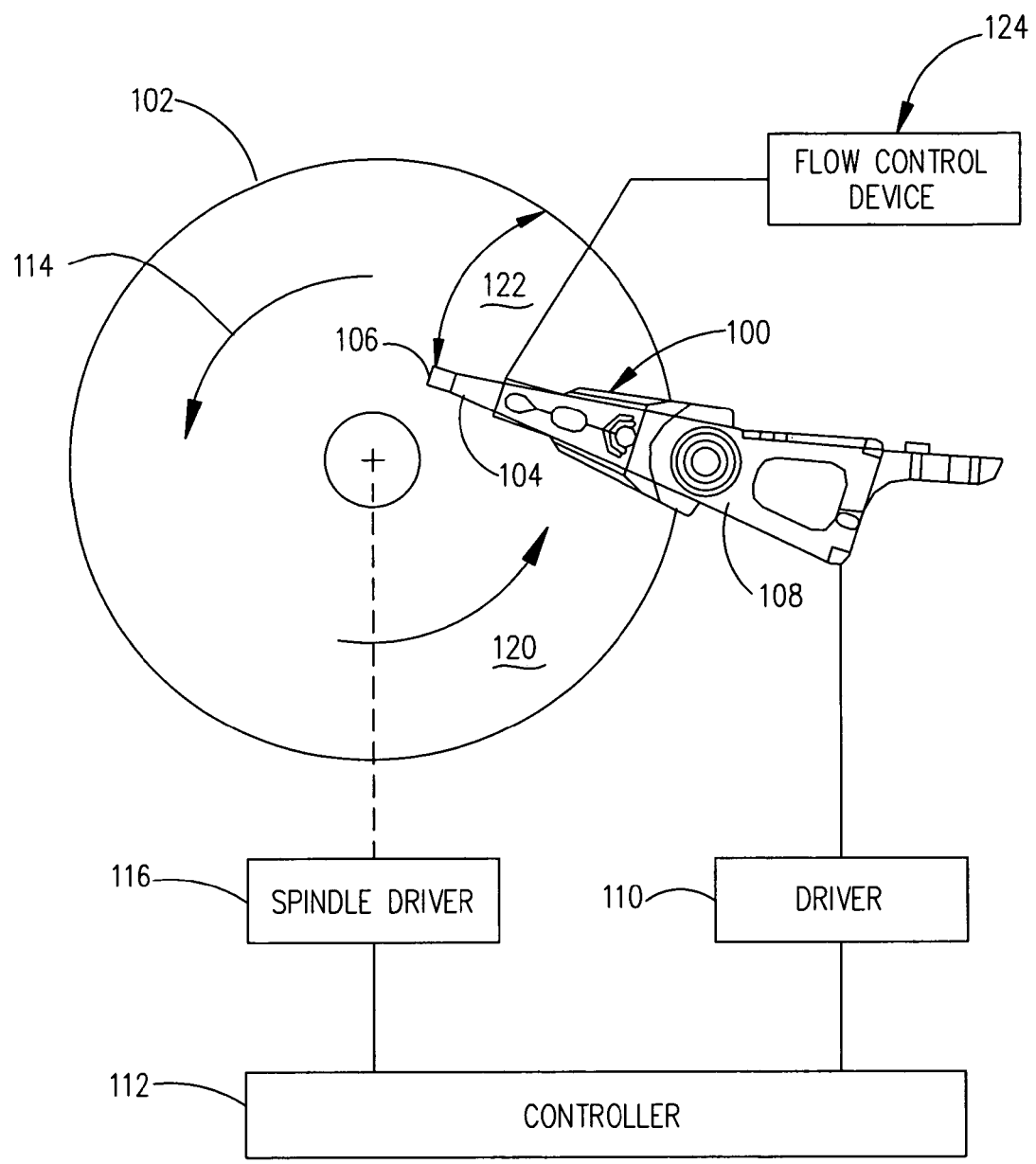
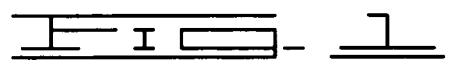

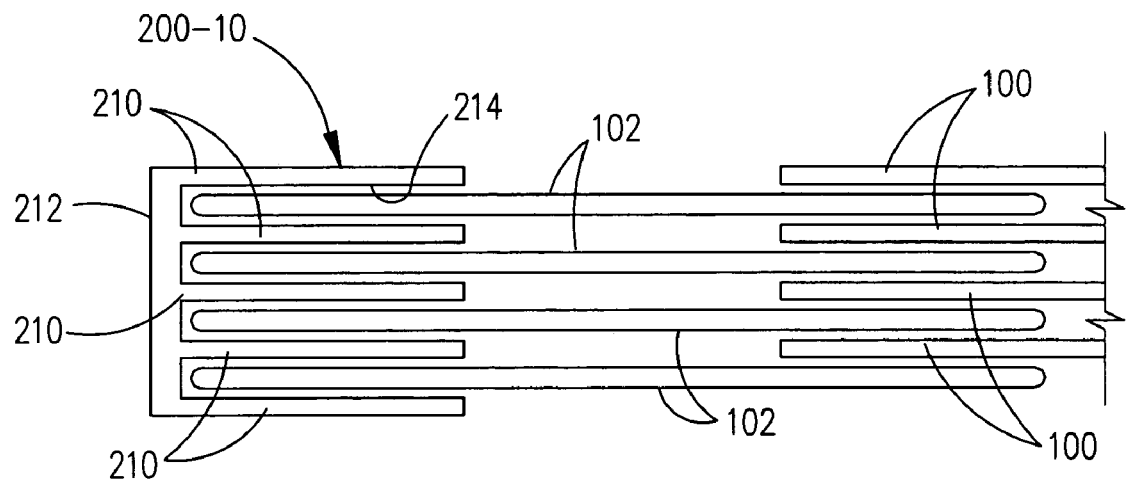
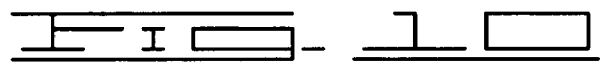
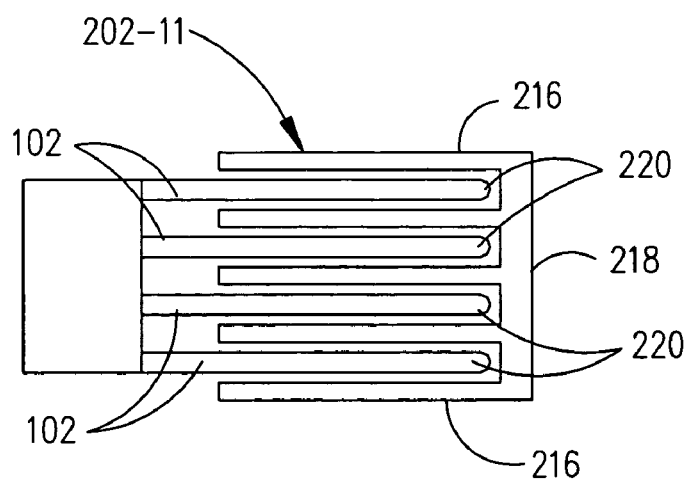

US 7,535,670 B2

FLOW OR WINDAGE CONTROL FOR A CANTILEVERED HEAD ASSEMBLY

CROSS-REFERENCE TO RELATED APPLICATION

This application claims priority from U.S. Provisional Application Ser. No. 60/449,566 filed on Feb. 21, 2003 and entitled "FLOW CONTROL FOR MDW WINDAGE MITIGATION".

FIELD OF THE INVENTION

The present invention relates generally to flow control, and more particularly but not by limitation to flow or windage control to limit windage disturbances proximate to a cantilevered head assembly.

BACKGROUND OF THE INVENTION

Data storage devices store digitally encoded information on discs. Heads of cantilevered head assemblies read data from or write data to discs which are supported for rotation relative to a base chassis by a spindle motor or drive. Heads include transducer elements, such as magnetoresistive, magneto-optical or inductive elements for read or write operations. An actuator moves the cantilevered head assembly or assemblies relative to select data tracks on the disc to read data from or write data to the disc surface or media.

The head is positioned relative to tracks via a servo control system based upon servo information or patterns on a rotating disc or discs. For example, servo patterns or information can be encoded on a disc or discs between data sectors of each track of the disc "embedded servo information" or on a surface of a dedicated disc or "dedicated servo". Servo information or patterns are pre-recorded or written during manufacture of the data storage device for example, via a dedicated servo track writing apparatus including a cantilevered head assembly. Multi-disc servo track writers are used to prerecord servo patterns or information to a plurality of discs for high-density recording.

Rotation of discs for read and/or write operations provides an air or gas flow path along the disc surface. Flow disturbances proximate to a cantilevered head assembly or assemblies interfere with head positioning or contribute to head positioning errors. Recording density is increasing requiring more accurate head positioning and servo control feedback which is limited by alignment of recorded servo patterns or information on the disc or discs. Embodiments of the present invention provide solutions to these and other problems, and offer other advantages over the prior art.

SUMMARY OF THE INVENTION

The present invention relates to an apparatus including a cantilevered head assembly. The apparatus includes a flow control device to limit flow disturbances proximate to the cantilevered head assembly. In particular as described, the flow control device includes a blower and/or a vacuum assembly to limit flow disturbances. Other features and benefits that characterize embodiments of the present invention will be apparent upon reading the following detailed description and review of the associated drawings.

BRIEF DESCRIPTION OF THE DRAWINGS

FIG. 1 is a schematic illustration of an embodiment of a cantilevered head assembly and flow control device to limit flow disturbances proximate to the cantilevered head assembly.

FIG. 8 illustrates an embodiment of a servo writer apparatus including a blower assembly and/or vacuum suction assembly.

FIG. 10 illustrates an embodiment of an air dam for a multiple disc apparatus.

DETAILED DESCRIPTION OF ILLUSTRATIVE EMBODIMENTS

Figure 2:
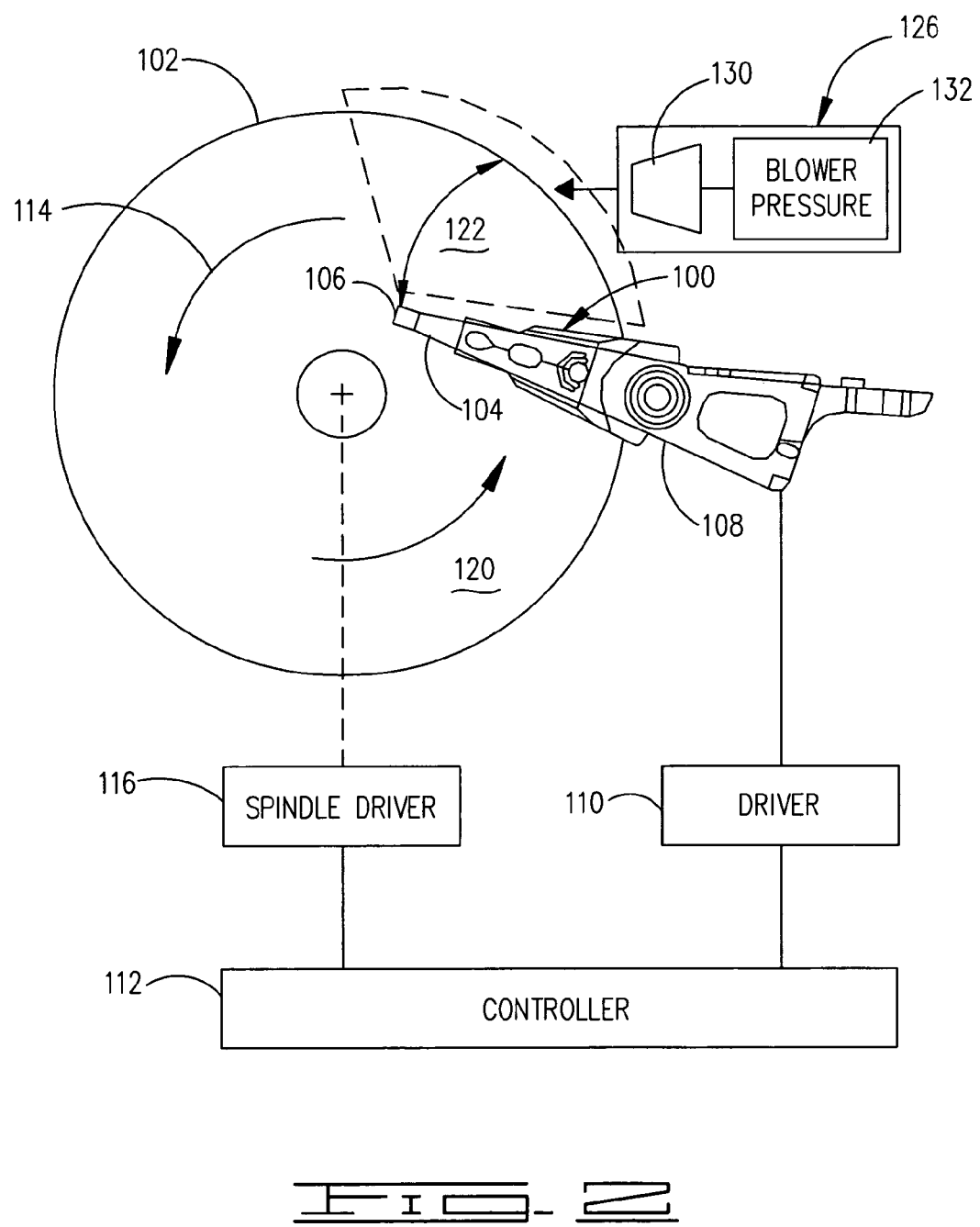
FIG. 2 is a schematic illustration of an embodiment of a cantilevered head assembly and blower assembly.

FIG. 1 is a schematic illustration of a cantilevered head assembly 100 supported relative to a rotating disc 102 to read or write information (for example) to write or record servo information or patterns on the disc. The cantilevered head assembly 100 includes a cantilevered body 104 having a head 106 coupled thereto. The cantilevered head assembly 100 is coupled to an actuator 108 to position the head 106 relative to the rotating disc 102. Actuator 108 is positioned or rotated via operation of a driver 110 based upon commands or signals from a controller 112. Discs are rotated as illustrated by arrow 114 via operation of a spindle driver or motor 116 operably coupled to the controller 112 or other device to read or write information to the discs. Rotation of the disc as illustrated by arrow 114 creates an air, gas or medium flow path along the disc surface.

The cantilevered head assembly 100 extends in the flow path defining an upstream flow region 120 and a downstream flow region 122 relative to cantilevered head assembly 100. Restriction of flow across the cantilevered head assembly 100 can provide a pressure differential between the upstream flow region 120 and the downstream flow region 122 and/or create disturbances in the flow field proximate to the cantilevered head assembly 100. The pressure differential or disturbances proximate to the cantilevered head assembly can increase off-track motion of the head and/or head positioning errors.

The system or device of the present invention relates to a flow control device 124 (illustrated schematically) proximate to the cantilevered head assembly 100 to control windage or disturbances proximate to the cantilevered head assembly 100. In particular, in an embodiment illustrated in FIG. 2, the flow control device includes a blower assembly 126. As shown in FIG. 2, the blower assembly 126 includes a nozzle 130 directed or positioned to provide pressure (e.g. air, gas or other medium) from a pressure source or blower 132 proximate to the downstream region 122 of the cantilevered head assembly. The pressure parameters are designed to optimize temperature distribution or pressure disturbances across the cantilevered head assembly 100 based upon disc size and rotation speed (RPM) to reduce flow and thermal disturbances.

Figure 3A:
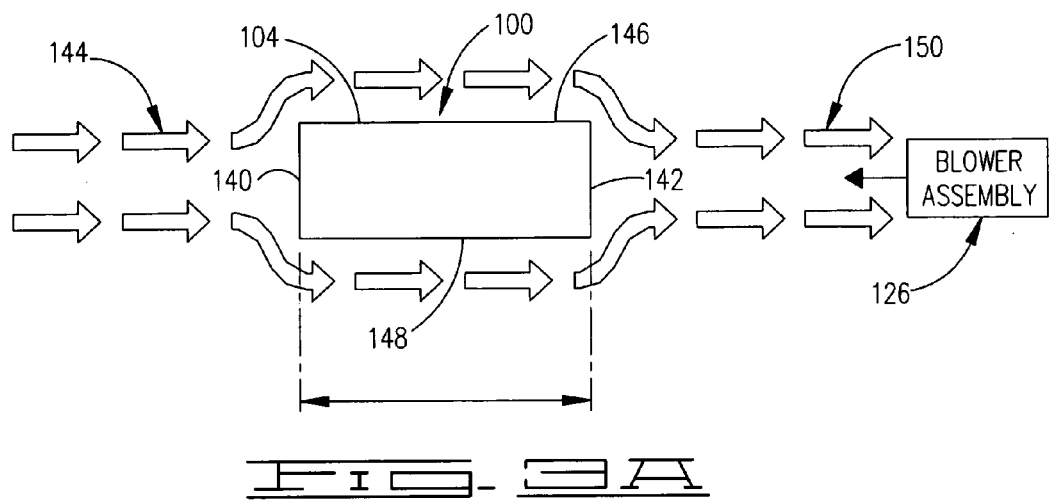
FIGS. 3A and 3B schematically illustrate flow about a cantilevered body of a cantilevered head assembly.
Figure 3B:
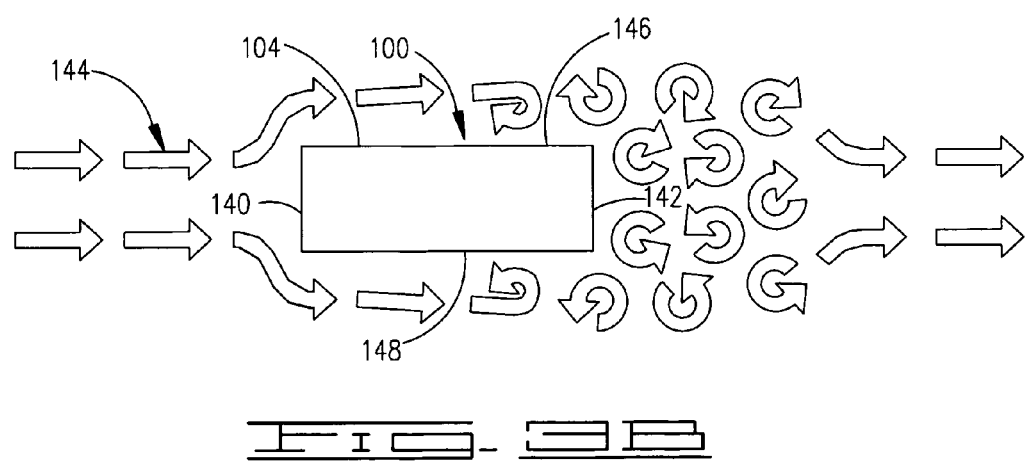

In particular as shown in FIGS. 3A and 3B, the cantilevered head assembly 100 includes a leading edge 140 and a trailing edge 142 and the cantilevered body 104 therebetween. For example, in an illustrated embodiment, the cantilevered head assembly 100 includes a rigid actuator arm and head suspension assembly. Flow 144 is separated proximate to the leading edge 140 of the cantilevered body and flows along opposed surfaces 146, 148 of the cantilevered body 104. Friction or drag along the opposed surfaces 146, 148 induces flow separation along a length of the cantilevered body creating an area of higher turbulence proximate to the trailing edge 142 of the cantilevered body. Turbulence or flow disturbances increase vibration or movement of the cantilevered body or head assembly thus increasing head positioning errors. In an illustrated embodiment in FIG. 3B, the blower assembly 126 provides a pressure or flow proximate to the trailing edge 142 of the cantilevered body 104 to delay or limit separation of flow across the profile of the cantilevered body 104 to reduce turbulence and provide a more laminar trailing edge flow region 150 about the cantilevered body 104.

Figure 4:
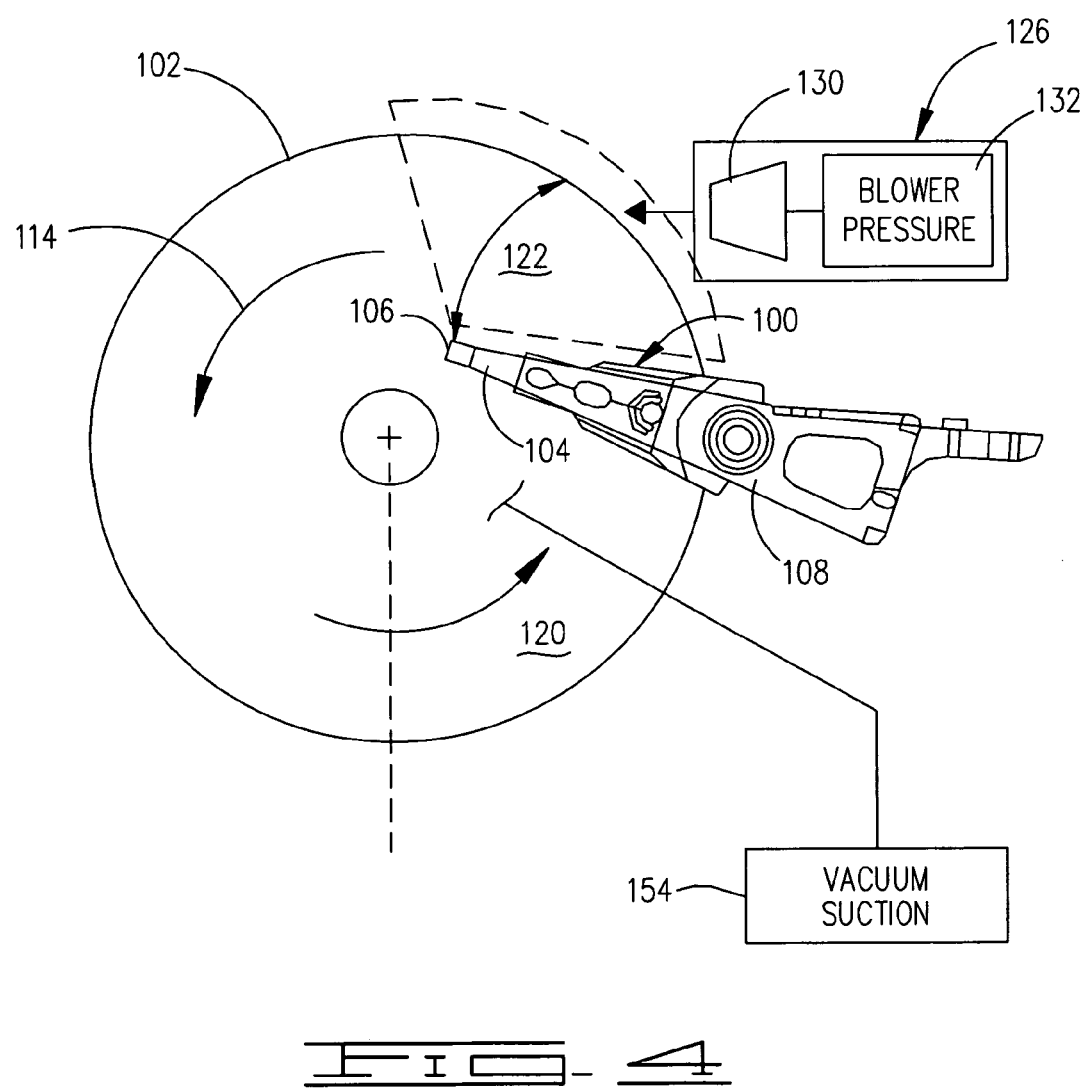
FIG. 4 is a schematic illustration of an embodiment of a cantilevered head assembly and blower and vacuum assemblies.

FIG. 4 illustrates a flow control device to control windage and disturbance for a cantilevered head assembly which includes a vacuum or suction assembly 154 to reduce or control a pressure differential across the cantilevered body 104. In the particular embodiment illustrated in FIG. 4, the apparatus includes both the vacuum or suction assembly 154 proximate to the upstream region and a blower assembly 126 proximate to the downstream region of the cantilevered head assembly. Vacuum assembly 154 provides suction proximate to the upstream region 120 of the cantilevered head assembly to control windage or flow disturbances proximate to the cantilevered head assembly 100 in combination with the blower assembly 126. The amount of blowing and suction is designed to inter alia reduce torque disturbances, forces on the cantilevered assembly and temperature gradients to limit vibration, temperature drifts, and/or non-uniform expansion and/or contraction of the cantilevered body or head assembly.

In one embodiment, flow is controlled via the vacuum assembly 154 and in a particular embodiment a vacuum assembly upstream of the cantilevered head assembly, although application is not limited to the particular embodiment. The flow control device can include the blower assembly 126 and/or the vacuum assembly 154 to provide the flow control device 124 for the system and application is not limited to the particular embodiments shown including both a vacuum assembly upstream of the cantilevered head assembly and a blower assembly downstream of the cantilevered head assembly or any particular location thereof.

In illustrated embodiments, the blowing assembly and/or vacuum assembly provide a preprogrammed or programmable pressure or input to provide passive windage control during operation of the device or assembly. The preprogrammed or programmable parameters are based upon disc size or operating speeds (or RPM) and/or based upon theoretical, mathematical or test models to optimize windage or disturbance characteristics of the cantilevered head assembly. In another embodiment, flow control parameters are adjusted based upon windage or flow measurements or feedback to provide active windage control.

Figure 5A:
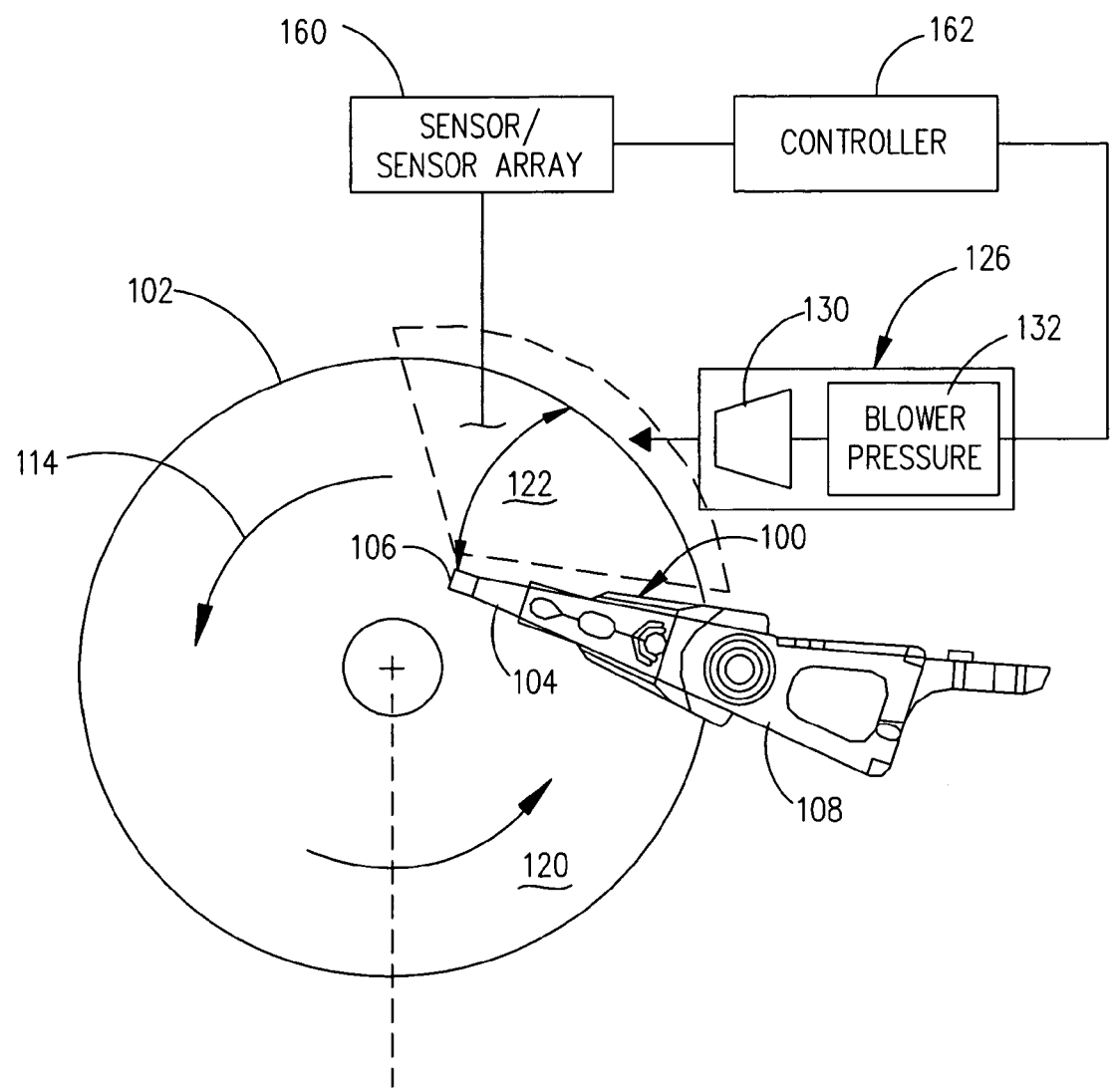
FIG. 5A is a schematic illustration of an embodiment of a blower assembly including flow feedback.
Figure 5B:
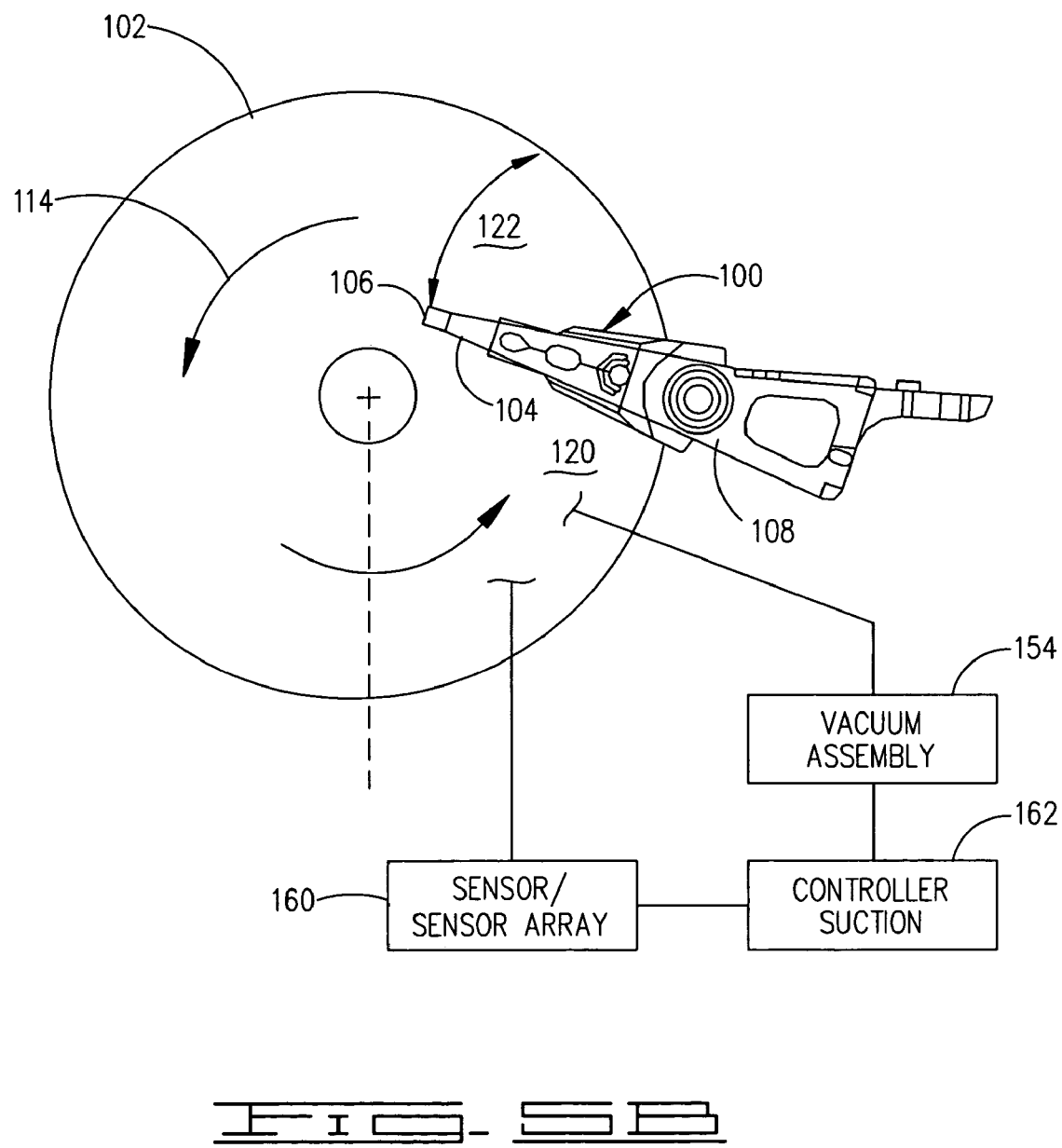
FIG. 5B is a schematic illustration of an embodiment of a vacuum assembly including flow feedback.

In active flow or windage control embodiments illustrated in FIGS. 5A and 5B, the assembly includes a sensor or array of sensors 160 to provide feedback to a controller 162 to control parameters for the blower assembly 126 as illustrated in FIG. 5A and/or the vacuum assembly 154 as illustrated in FIG. 5B to optimize windage and flow parameters and reduce head positioning errors. In particular in an illustrated embodiment of FIG. 5A, sensor or sensor array 160 includes a hot wire anemometer or pressure sensor which measures the velocity or pressure in the downstream region 122 to provide feedback to the controller 162 to control blower pressure or force to limit wind induced vibration or off-track motion. Feedback sensor or sensor array 160 is not limited to an anemometer and can include alternate pressure sensors or devices to provide flow, windage or temperature feedback. In an alternate embodiment, flow sensor or sensor array 160 is positioned relative to the upstream flow region to control vacuum assembly 154 of FIG. 5B.

Figure 6:
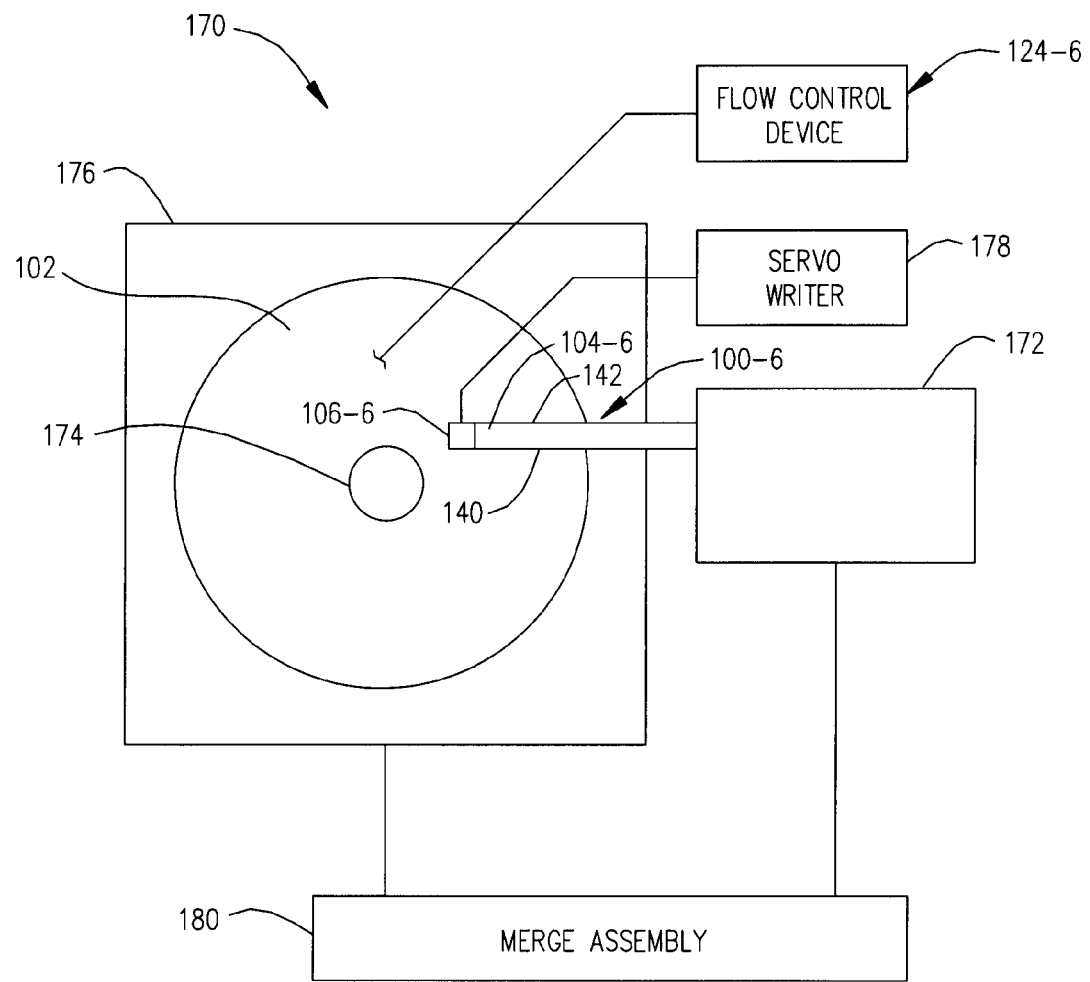
FIG. 6 is a schematic illustration of an embodiment of a servo writer apparatus including a cantilevered head assembly and flow control device.

As previously discussed, servo information or patterns are used to control head position relative to a disc or data storage media (e.g. track following or to control movement of a head from one track to another during a seek operation). Servo information or patterns are encoded at a drive level after assembly of a head suspension or cantilevered head assemblies. Alternately servo information or patterns are encoded or recorded on discs via a dedicated servo writing apparatus 170 as schematically illustrated in FIG. 6 where like numbers are used to refer to like parts in the previous FIGS. As shown, the apparatus 170 includes a cantilevered head assembly 100-6 coupled to a servo block 172 (illustrated schematically). The cantilevered head assembly 100-6 includes a servo head 106-6 to encode servo information or patterns on a disc 102 supported relative to a spindle hub 174 of a spindle block 176. The head 106-6 is energized via a servo writer 178 to encode servo patterns or information on the disc surface.

Disc or discs 102 are rotated on the spindle hub 174 by a spindle driver (not shown) of the spindle block 176 and the cantilevered head assembly 100-6 is positioned relative to the disc via an actuator assembly of servo block 172 (including for example, an air bearing actuator pivot or other pivot assembly) in cooperation with operation of servo writer 178 to record servo information to the disc or media. Preferably, servo head 106-6 is positioned relative to the disc using a laser interfometer for measuring the angular displacement and positioning of the servo head 106-6. As shown, the servo writer apparatus 170 includes a flow control device 124-6 to control windage or flow disturbances proximate to the cantilevered head assembly 100-1 as previously described.

A disc or discs 102 are loaded onto the spindle hub 174 and the cantilevered head assembly or assemblies 106-6 and disc or discs 102 are merged to record servo information or patterns on the disc or discs. In the illustrated embodiment, the spindle block 176 and servo block 172 are coupled to a merge assembly 180 (illustrated diagrammatically) to move the spindle block 176 and servo block 172 between a retracted position to load and unload disc(s) and a merged position to record servo information. Following completion of the servo writing process, the spindle block 176 and servo block 172 are unmerged to remove the recorded discs 102 from the spindle block 176.

Figure 7:
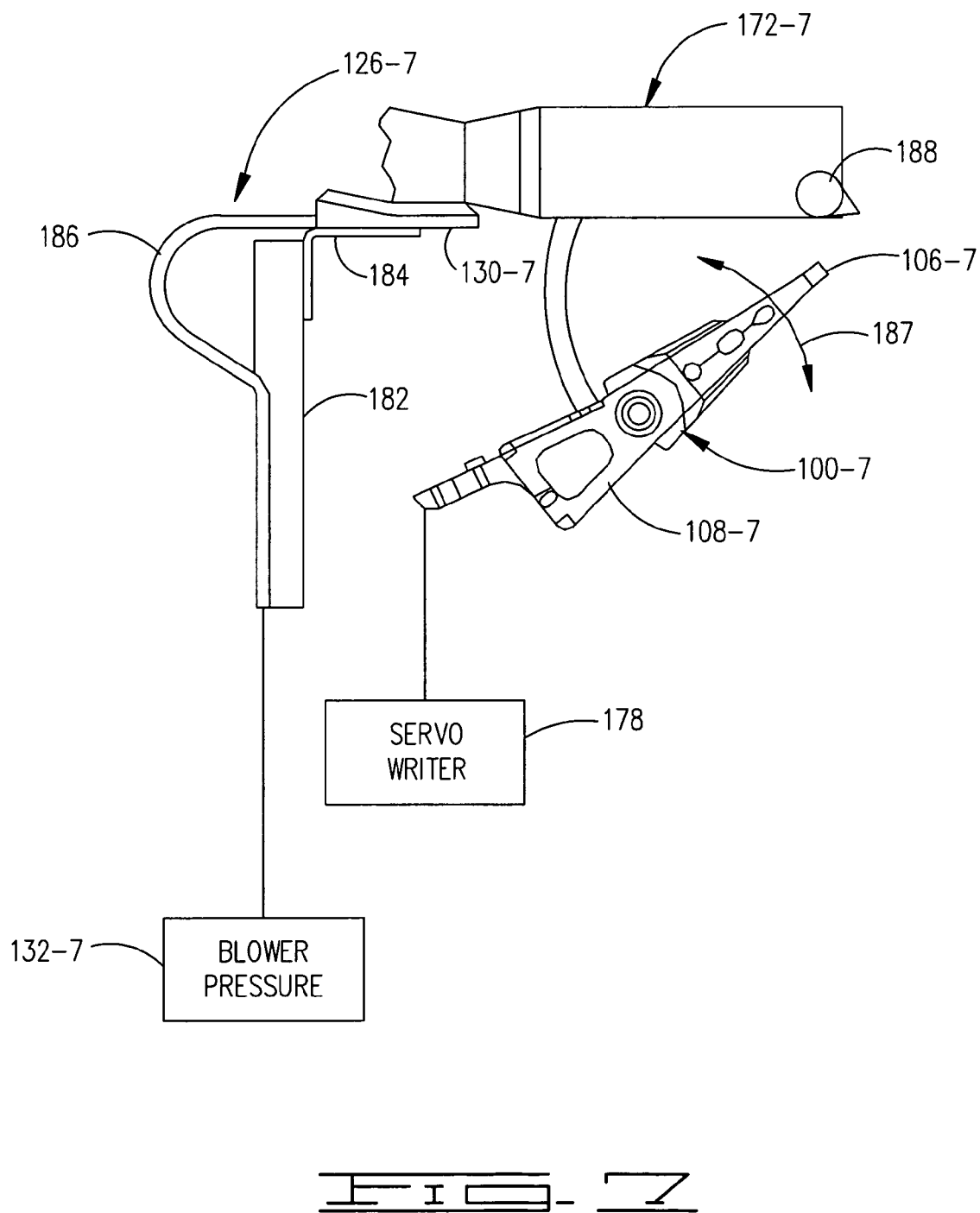
FIG. 7 illustrates an embodiment of a blower assembly for a servo writer apparatus.

FIG. 7 is a detailed illustration of an embodiment of a cantilevered head assembly 100-7 of a servo writer apparatus including blower assembly 126-7 having nozzle 130-7 supported by a platform 182 and bracket 184. Nozzle 130-7 is coupled to pressure source or blower 132-7 via hose 186 to provide air or gas pressure proximate to the cantilevered head assembly 100-7 or actuator 108-7 rotationally coupled to the servo block 172 as illustrated by arrow 187. In the illustrated embodiment, platform 182 is positioned or spaced to provide near field blowing proximate to the downstream flow region based upon operating and flow parameters. Alternatively, the blower assembly 126-7 can be positioned to provide far field blowing and application is not limited to a particular region or downstream region. As shown, the nozzle 130-7 has an enlarged outlet width or dimension corresponding to a height of a plurality of cantilevered head assemblies for a multiple disc actuator or actuator block. A head ramp or cam 188 is operable to separate servo heads 106-7 to merge the cantilevered head assemblies 100-7 and discs as previously described for a servo writer apparatus.

FIG. 8 schematically illustrates an embodiment of a multiple disc servo track writer or apparatus 170-8 where like numbers are used to refer to like parts in the previous figures. As shown, the spindle hub 174-8 supports a plurality of discs 102 to write servo information to a plurality of discs via a plurality of cantilevered head assemblies coupled to actuator block 108-8. In the illustrated embodiment, the spindle hub 174-8 is orientated to vertically support a plurality of discs although application is not limited to a vertically orientated servo writer apparatus as shown. In illustrated embodiments, spindle hub or spindles could be air bearings, hydrodynamic or ball bearings (such as stainless steel or ceramic).

As shown in FIG. 8, spindle hub 174-8 and/or spindle block 176-8 are stationary supported relative to platform 190 and the cantilevered head assemblies 100-8 and/or servo block 172-8 are movably supported relative to the base or platform 190 as illustrated by arrow 192. The cantilevered head assemblies 100-8 and/or servo block 172-8 are moved between a retracted position (shown in FIG. 8) and a merged position to selectively position the disc or discs and the cantilevered head assemblies 100-8 between the retracted position to load and unload discs and the merged position to record servo information. Discs are removably secured to the spindle hub 174-8 via a clamp.

Although servo block 172-8 is movably supported in the illustrated embodiment of FIG. 8, application is not so limited and the spindle block 176-8 or both the spindle block 176-8 and servo block 172-8 can be movable between a retracted position and a merged position. Platform or base 190 is formed of a relatively impact or vibration resistant structure, such as a granite slab, to restrict movement or vibration of the apparatus or components during the servo writing process to limit servo writing errors. Platform or base 190 is also isolated by shock isolators and/or vibration dampers.

Figure 9:
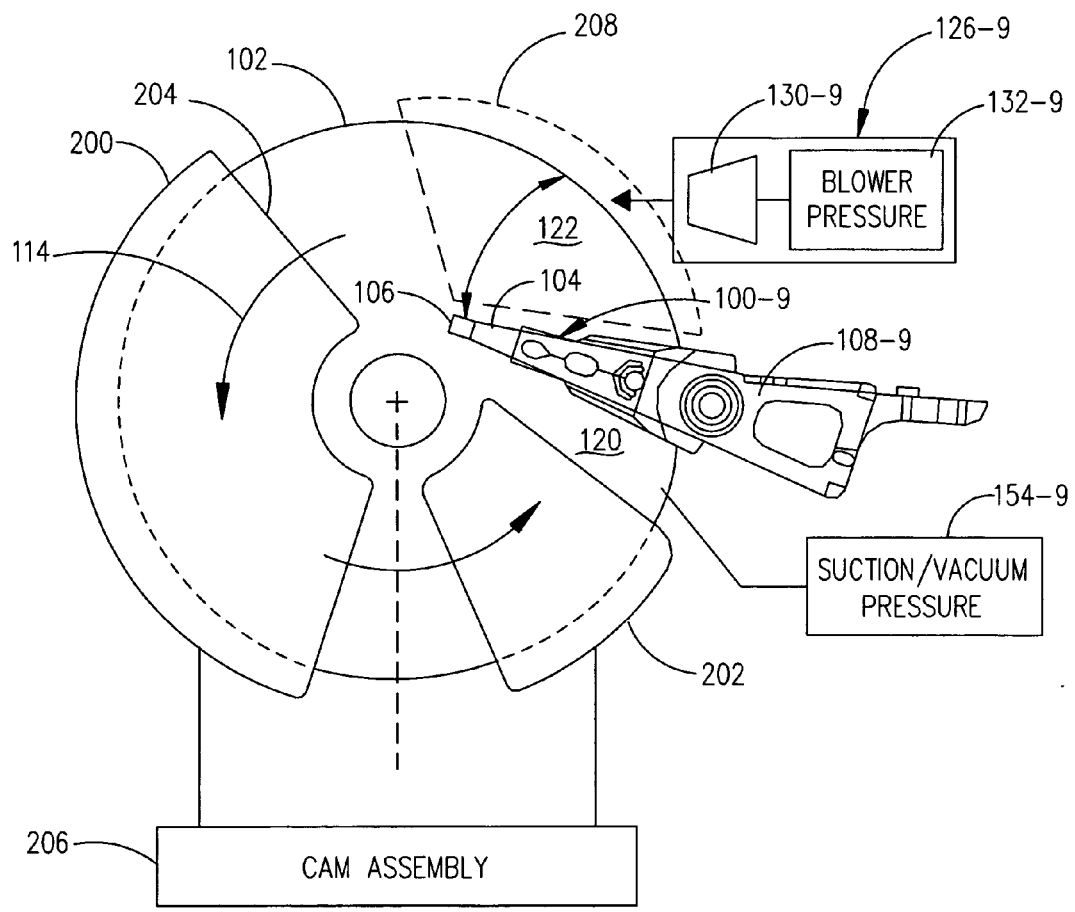
FIG. 9 illustrates an embodiment of an apparatus including an air dam and stripper and blower assembly and/or vacuum suction assembly.

In the illustrated embodiment, servo track writer or apparatus 170-8 includes an air dam 200 and a stripper 202 to condition flow in the flow field proximate to the disc 102 and flow conditioning device 124-8. Air dam 200 restricts flow to provide a high-pressure region proximate to a leading edge 204 of the air dam 200 downstream of the cantilevered head assembly or assemblies as illustrated in FIG. 9. Stripper 202 is positioned upstream of the cantilevered head assembly or assemblies 100-9 as illustrated in FIG. 9. Air dam 200 and stripper 202 are coupled to a cam or actuator assembly 206 to move the air dam 200 and stripper 202 between an opened position (as illustrated in FIG. 8) to load and unload discs and a closed position to record servo information.

In the embodiment illustrated in FIG. 9, the flow control device includes blower assembly 126-9 positioned to provide flow or blowing in a downstream zone 208 in a gap between the air dam 200 and the stripper 202 and/or a vacuum or suction assembly 154-9 as shown or previously described. In an illustrated embodiment, the blower assembly 126-9 and/or suction assembly 154-9 can be controlled based upon feedback from a sensor or sensor array not shown in FIG. 9.

FIG. 10 is a cross-sectional view of an embodiment of an air dam 200-10 merged with a plurality of discs. As shown, air dam 200-10 includes spaced flow plates 210 extending from an edge portion or body 212 and having a gap 214 between adjacent flow plates. A disc 102 is positioned relative to the gap 214. The disc 102 rotates within the gap 214 and plates 210 are aligned relative to the flow field proximate to the disc surface to provide a high-pressure zone proximate the leading edge 204 of the air dam 200 downstream of the cantilevered head assembly as shown in FIG. 9. Edge portion or body 212 is contoured relative to the disc edge to provide a boundary wall to restrict air or other media flow.

Figure 11:
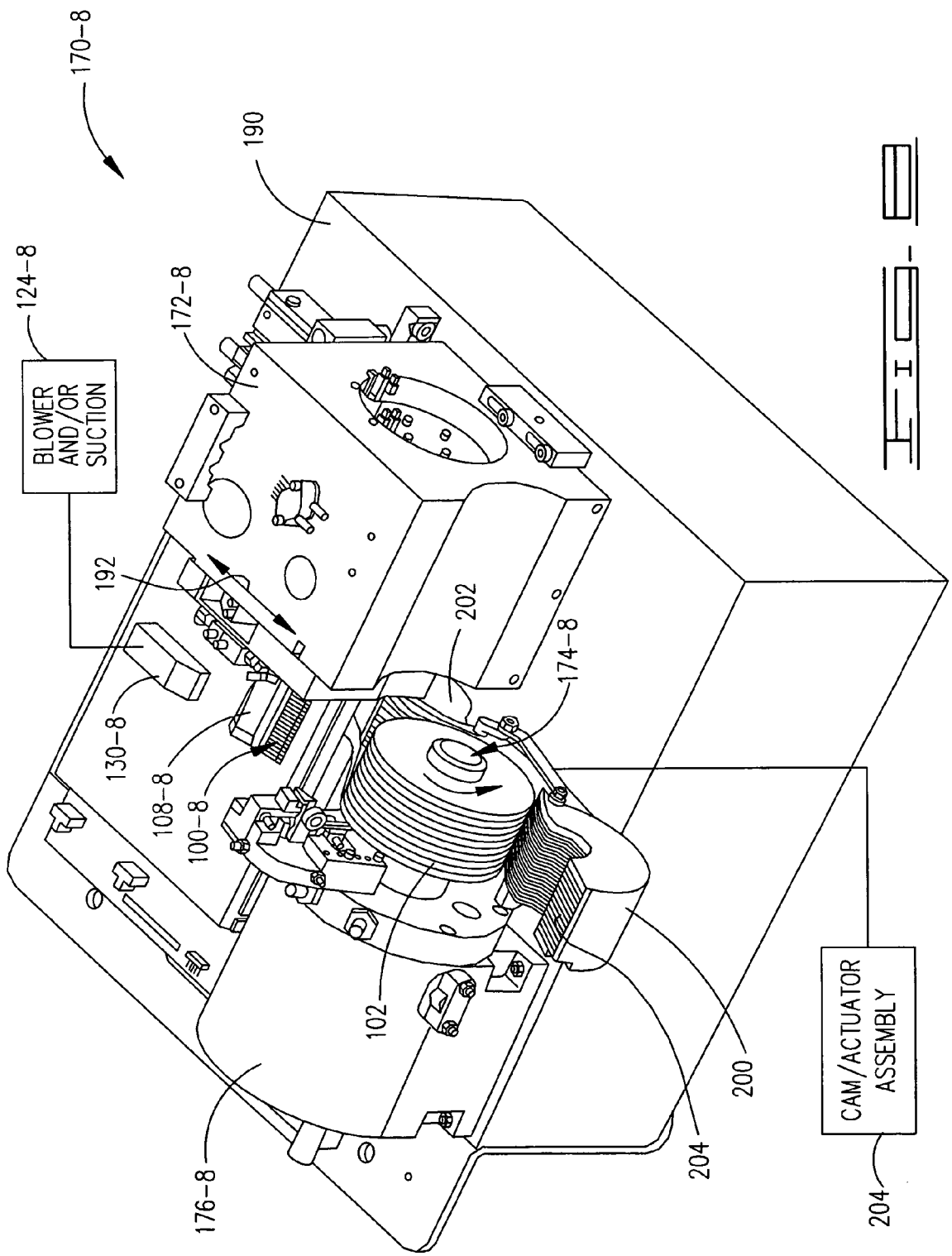
FIG. 11 illustrates an embodiment of a stripper for a multiple disc apparatus.

Flow to the cantilevered head assembly or assemblies 100 is conditioned by the stripper 202 upstream of the cantilevered head assembly 100. An embodiment of an air stripper 202-11 for multiple discs is illustrated in the cross-sectional view of FIG. 11. As shown, the stripper 202-11 includes spaced stripper plates 216 extending from an edge or body portion 218 and a gap 220 therebetween. Discs 102 rotate within gaps 220 so that the stripper plates 216 are positioned proximate to the flow field or disc surface upstream of the cantilevered head assembly 100.

Figure 12:
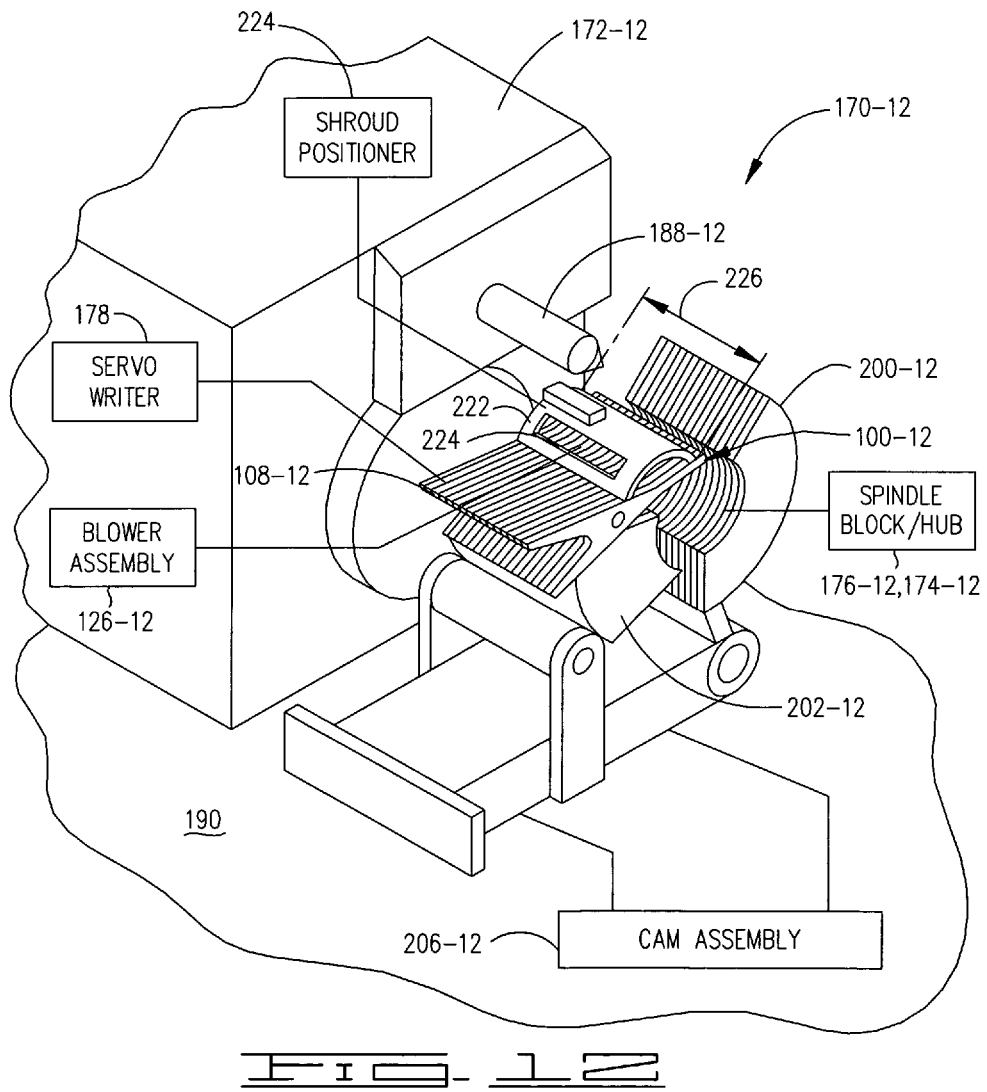
FIG. 12 illustrates an embodiment of an actuator including a plurality of cantilevered head assemblies and a shroud, stripper and blower assembly for a servo writing apparatus.

FIG. 12 illustrates an alternate embodiment of a vertical multiple disc servo writer or apparatus 170-12 including an air dam 200-12, stripper 202-12 and shroud 222 where like numbers are used to refer to like parts in the previous figures. In the illustrated embodiment, actuator 108-12 for the cantilevered head assemblies 100-12 is rotationally coupled to the servo block 172-12 (e.g. via an air bearing pivot or assembly) and air dam 200-12 and stripper 202-12 are shown in the closed position with the discs removed for clarity. The apparatus 170-12 also includes shroud 222 and positioner 224 which moves the shroud 222 between a retracted position (not shown) and an operating position proximate to the disc or discs to load/unload discs and to merge the cantilevered head assemblies for servo writing operation.

Positioner 224 is illustrated schematically and can include hydraulic, pneumatic or mechanical devices that are operable or energizable to move the shroud 222 between the retracted position to load and unload discs and the operating or engaged position shown. In the operating position, shroud 222 is positioned proximate to an edge of the disc to provide a flow boundary along a downstream edge or region of the disc. In an illustrated embodiment, shroud 222 has a dimension 226 which extends between inner and outer discs (not shown) supported on the spindle block 174-12.

For operation discs 102 are loaded onto spindle hub 174-12 while the shroud 222 is retracted (not shown) and the air dam 200-12 and stripper 202-12 are in the opened or retracted position as previously described. Thereafter the servo block 172-12 and spindle block 176-12 are merged to position the plurality of cantilevered head assemblies 100 relative to the plurality of discs of the disc pack. Air dam 200-12 and stripper 202-12 are moved to the closed or merged position. The shroud 222 is moved to the operating position proximate to the discs or disc stack after the cantilevered head assemblies are merged with the discs.

The shroud 222 can be coupled to the servo block 172-12 or spindle block 176-12. Cam or ramp 188-12 maintains separation of the discs to merge the discs and the cantilevered head assemblies for servo writing operation. In particular, cam or ramp 188-12 includes a plurality of fingers spaced relative to the discs to engage the discs to maintain separation for merge operations. The cam or ramp 188-12 is coupled to the servo block 172-12 in the embodiment shown to move between a retracted position spaced from the discs and a merged position via actuator 108-12. In the merged position, the fingers or cam are positioned proximate to the discs to merge the discs and the cantilevered head assemblies.

Figure 13:
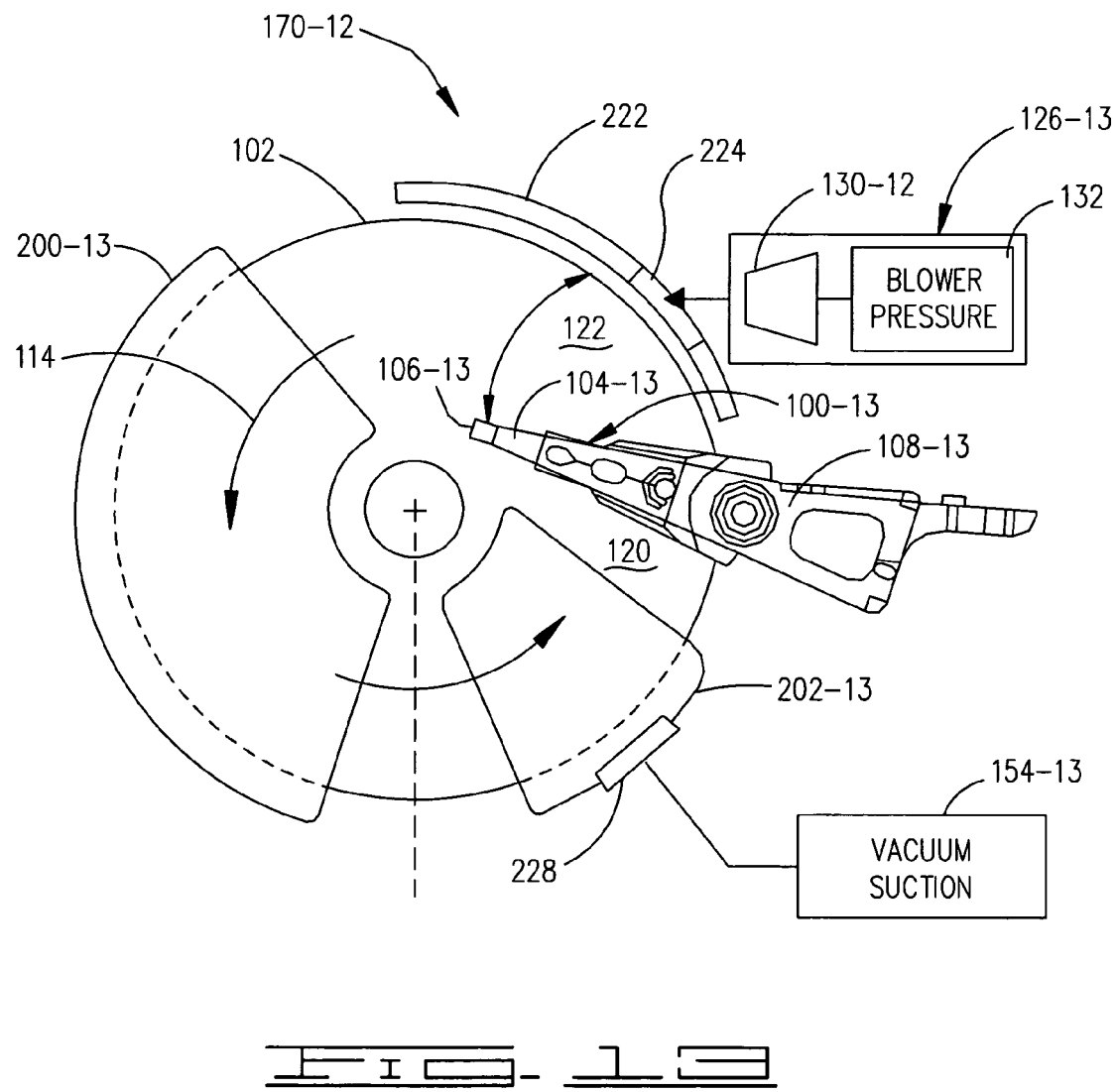
FIG. 13 illustrates an embodiment of an apparatus including a shroud, air dam, stripper and blower and/or vacuum assemblies.

In the illustrated embodiment of FIG. 12, the flow control device includes a blower assembly 126-12 positioned proximate to the shroud 222 to mitigate flow disturbances on the actuator assembly or cantilevered head assembly. As shown, the shroud 222 includes a flow passage 224 of the blower assembly 126-12. Although in the illustrated embodiment shroud 222 includes a single passage, the shroud 222 can include multiple passages which can be streamlined to control and direct flow. In an alternate embodiment illustrated in FIG. 13, the flow control device includes a blower assembly 126-13 proximate to the downstream region 122 and a vacuum assembly 154-13 proximate to the upstream region 120 as shown. The air stripper 202-13 includes a flow passage or passages 228 (illustrated schematically) to provide an opening or passage for the vacuum source proximate to the upstream flow region 120, as previously described. In the illustrated embodiment, the apparatus includes a blower assembly, a vacuum assembly and shroud although application is not limited to an apparatus including both a vacuum and blower assembly as shown or particular location or limited to passages in the shroud or air stripper. For example, the cantilevered head assembly 100-13 can include passage to control flow disturbances proximate to the cantilevered head assembly.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, features of the illustrated embodiments can be interchanged and the particular elements may vary depending on the particular application while maintaining substantially the same functionality without departing from the scope and spirit of the present invention. In addition, although preferred embodiments described herein are illustrated with respect to a system it will be appreciated by those skilled in the art that the teachings of the present invention can be applied to other systems without departing from the scope and spirit of the present invention.

What is claimed is:

1. An apparatus comprising: a first cantilevered assembly and a second cantilevered assembly each having an upstream leading edge and a downstream trailing edge, the first and second cantilevered assemblies being coupled to an actuator having a stack height; and a flow control device comprising a blower assembly and a nozzle having an elongated outlet having a dimension substantially corresponding to the stack which provide blowing pressure to the downstream trailing edge of said first and second cantilevered assemblies.

2. The apparatus of claim 1, wherein the flow control device further comprises a nozzle coupleable to the blower assembly to supply the blowing pressure proximate to said downstream trailing edges of said first and second cantilevered assemblies.

3. The apparatus of claim 1, wherein the flow control device further comprises a flow sensor coupled to a controller to regulate the blowing pressure.

4. The apparatus of claim 1, further comprising a shroud proximate to a downstream region of the cantilevered assemblies, wherein the blower nozzle is coupled to the blower assembly to provide the blowing pressure through at least one passage in the shroud.

5. The apparatus of claim 1, wherein each of the cantilevered assemblies comprises a transducer configured to write data to a storage medium.

6. The apparatus of claim 1, characterized as a multi-disc servo writer configured to write servo data to a plurality of rotatable discs.

7. An apparatus comprising:
a cantilevered assembly with an upstream leading edge and a downstream trailing edge;
a flow control device comprising a blower assembly which provides blowing pressure to the downstream trailing edge,
a fluidic dam downstream of the cantilevered assembly; and
a fluidic stripper upstream of the cantilevered assembly, the flow control device further comprising a nozzle coupled to the blower assembly positioned relative to a gap between the fluidic dam and the fluidic stripper.

8. An apparatus comprising:
a cantilevered assembly with an upstream leading edge and a downstream trailing edge; and
a flow control device comprising a blower assembly which provides blowing pressure to the downstream trailing edge, and wherein the flow control device further comprises a vacuum assembly which provides suction pressure to the upstream leading edge.

9. The apparatus of claim 8, wherein the flow control device provides the suction pressure through a passage in an air stripper.

10. An apparatus comprising:
a cantilevered assembly with an upstream leading edge and a downstream trailing edge; and
a flow control device comprising a vacuum assembly which provides suction pressure solely to a region proximate the upstream leading edge.

11. The apparatus of claim 10, wherein the flow control device provides the suction pressure through a passage in an air stripper.

12. The apparatus of claim 10, wherein the flow control device further comprises a flow control device comprising a blower assembly which provides blowing pressure proximate to the downstream trailing edge.

13. The apparatus of claim 10, wherein the flow control device further comprises a flow sensor coupled to a controller to regulate the suction pressure.

14. The apparatus of claim 10, wherein the cantilevered assembly comprises a transducer configured to write data to a storage medium.

15. The apparatus of claim 10, characterized as a multi-disc servo writer configured to write servo data to a plurality of rotatable discs.

16. A method comprising:
- establishing a fluidic flow path across a cantilevered assembly from an upstream leading edge to a downstream trailing edge thereof;
- supplying blowing pressure from a blower assembly to the downstream trailing edge; and
- supplying suction pressure from a vacuum assembly to the upstream leading edge.

17. The method of claim 16, wherein the fluidic flow of the establishing step is generated by rotation of a disc adjacent the cantilevered assembly.

18. The method of claim 17, further comprising a step of using the cantilevered assembly to write servo data to the disc during the establishing and supplying steps.

19. The method of claim 16, further comprising applying blowing pressure from a blower assembly to the downstream trailing edge during the establishing and supplying steps.

20. A method comprising:
- establishing a fluidic flow path across a cantilevered assembly from an upstream leading edge to a downstream trailing edge thereof; and
- supplying suction pressure proximate to the upstream leading edge without providing said suction pressure proximate to the downstream trailing edge.

21. The method of claim 20, wherein the fluidic flow of the establishing step is generated by rotation of a disc adjacent the cantilevered assembly.

22. The method of claim 21, further comprising a step of using the cantilevered assembly to write data to the disc during the establishing and supplying steps.

* * * * *